United States Patent [19]
Robinson

[11] Patent Number: 5,557,995
[45] Date of Patent: *Sep. 24, 1996

[54] RADIAL CUTTING TOOLS FOR CUTTING THICK-WALLED TUBULAR MEMBERS

[75] Inventor: Jerry H. Robinson, Mobile, Ala.

[73] Assignee: Wellcutter, Inc., Brewton, Ala.

[*] Notice: The term of this patent shall not extend beyond the expiration date of Pat. No. 5,394,776.

[21] Appl. No.: 383,502

[22] Filed: Feb. 2, 1995

Related U.S. Application Data

[63] Continuation-in-part of Ser. No. 361,826, Dec. 22, 1994, which is a continuation-in-part of Ser. No. 45,411, Apr. 13, 1993, Pat. No. 5,394,776.

[51] Int. Cl.$^6$ ................................................. B23B 5/14
[52] U.S. Cl. ........................... 82/113; 407/103; 407/117
[58] Field of Search ................................. 82/81, 82, 83, 82/84, 85, 86, 87, 112, 113; 407/103, 117

[56] References Cited

U.S. PATENT DOCUMENTS

| | | | |
|---|---|---|---|
| 258,973 | 6/1882 | Armstrong . | |
| 857,284 | 6/1907 | Huber . | |
| 1,109,049 | 9/1914 | Dunn . | |
| 1,160,387 | 11/1915 | Curtis . | |
| 1,346,561 | 7/1920 | Schneider . | |
| 1,419,936 | 6/1922 | Ladd . | |
| 1,503,459 | 7/1924 | Overn, Jr. . | |
| 1,664,807 | 4/1928 | Cole . | |
| 1,695,363 | 12/1928 | Causey et al. . | |
| 1,753,704 | 4/1930 | Hyde et al. . | |
| 1,892,863 | 1/1933 | Blanc . | |
| 1,894,784 | 1/1933 | O'Connor et al. . | |
| 1,902,616 | 3/1933 | Brungardt et al. . | |
| 2,039,427 | 5/1936 | Kinzbach . | |
| 2,103,486 | 12/1937 | Motch, Jr. et al. . | |
| 2,281,450 | 4/1942 | Motch, Jr. et al. . | |
| 2,459,075 | 1/1949 | Hibbard . | |
| 3,024,687 | 3/1962 | Brownstein . | |
| 3,238,607 | 3/1966 | Wallborn . | |
| 3,299,491 | 1/1967 | Hall . | |
| 3,333,489 | 8/1967 | Mossberg . | |
| 3,551,977 | 1/1971 | Novkov . | |
| 3,733,939 | 5/1973 | Paysinger et al. | 82/113 |
| 3,848,489 | 11/1974 | Santana . | |
| 3,889,330 | 6/1975 | Zweekly . | |
| 3,908,491 | 9/1975 | Gilmore | 82/113 |
| 4,095,916 | 1/1978 | Hammond . | |
| 4,112,794 | 9/1978 | Franks et al. . | |
| 4,186,630 | 2/1980 | Lindhag | 82/113 |
| 4,213,357 | 7/1980 | Lively et al. . | |
| 4,302,135 | 11/1981 | Lillie . | |
| 4,320,996 | 3/1982 | Roos . | |
| 4,357,123 | 11/1982 | Zweekly . | |
| 4,397,202 | 8/1983 | Mayfield et al. . | |
| 4,418,591 | 12/1983 | Astle . | |
| 4,483,223 | 11/1984 | Nall et al. | 82/113 |
| 4,483,522 | 11/1984 | Nall et al. . | |
| 4,624,052 | 11/1986 | Garcia et al. | 82/113 X |

(List continued on next page.)

FOREIGN PATENT DOCUMENTS

| | | | |
|---|---|---|---|
| 437220 | 11/1926 | Germany . | |
| 2210668 | 9/1973 | Germany . | |
| WO1003341 | 3/1991 | WIPO | 82/113 |

Primary Examiner—M. Rachuba
Assistant Examiner—Henry Tsai
Attorney, Agent, or Firm—Nixon & Vanderhye P.C.

[57] ABSTRACT

Relatively thick-walled (or solid) tubular members may be cut by cutting tools which include a frame assembly which is concentrically positionable (either interiorly or exteriorly) relative to the tubular member to be cut. A radial cutting assembly defines a cutting plane and is connected to the frame so as to be rotationally movable about the longitudinal axis of the tubular member to be cut. The radial cutting assembly carries a bit subassembly (preferably a pair of generally radially opposed cutting assemblies) for cutting the tubular member. A drive/indexing assembly is provided so as to rotate the rotatable ring (and thereby cause the radial cutting assembly to move orbitally about said tubular member), and index the bit radially toward the tubular member in response to rotational movement of the radial cutting assembly.

42 Claims, 11 Drawing Sheets

U.S. PATENT DOCUMENTS

| | | |
|---|---|---|
| 4,631,995 | 12/1986 | Vroenen . |
| 4,664,567 | 5/1987 | Edwards . |
| 4,665,782 | 5/1987 | VanderPol . |
| 4,705,435 | 11/1987 | Christoffel . |
| 4,739,685 | 4/1988 | Ricci . |
| 4,754,672 | 7/1988 | VanderPol . |
| 4,762,038 | 8/1988 | Olson . |
| 4,791,842 | 12/1988 | Olson . |
| 4,813,314 | 3/1989 | Kwech . |
| 4,829,860 | 5/1989 | VanderPol . |
| 4,854,200 | 8/1989 | Mynhier . |
| 4,938,040 | 7/1990 | Pavo et al. . |
| 4,939,964 | 7/1990 | Ricci . |
| 4,944,205 | 7/1990 | Ricci . |
| 5,050,291 | 9/1991 | Gilmore ................................ 82/113 X |
| 5,054,342 | 10/1991 | Swiatowy et al. . |
| 5,394,776 | 3/1995 | Robinson ................................ 82/113 |

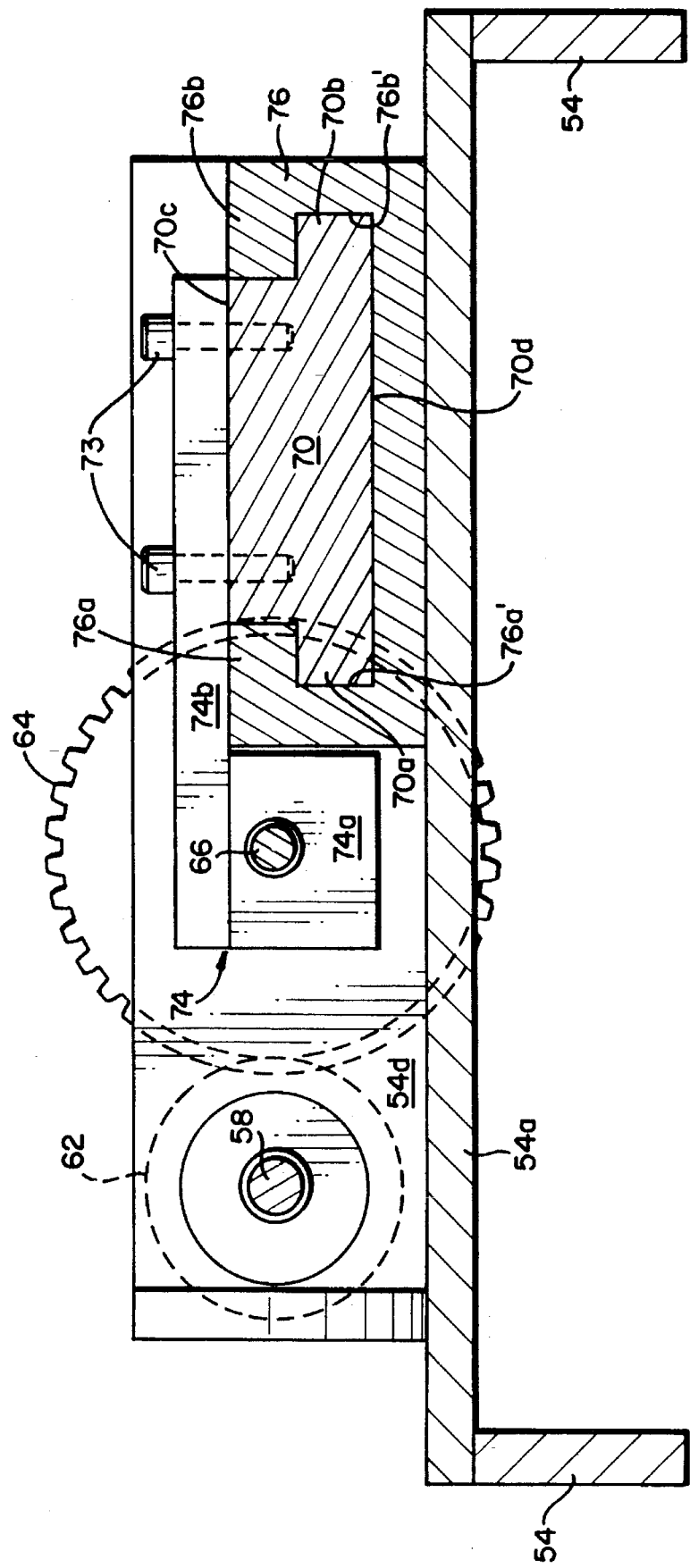

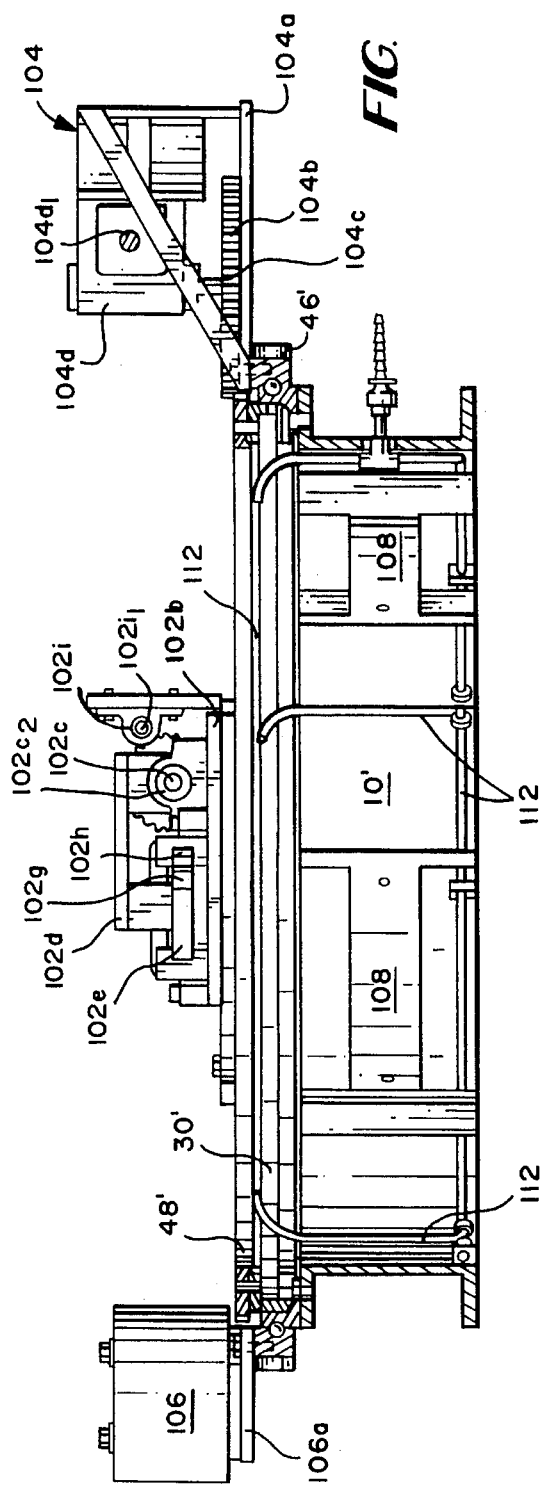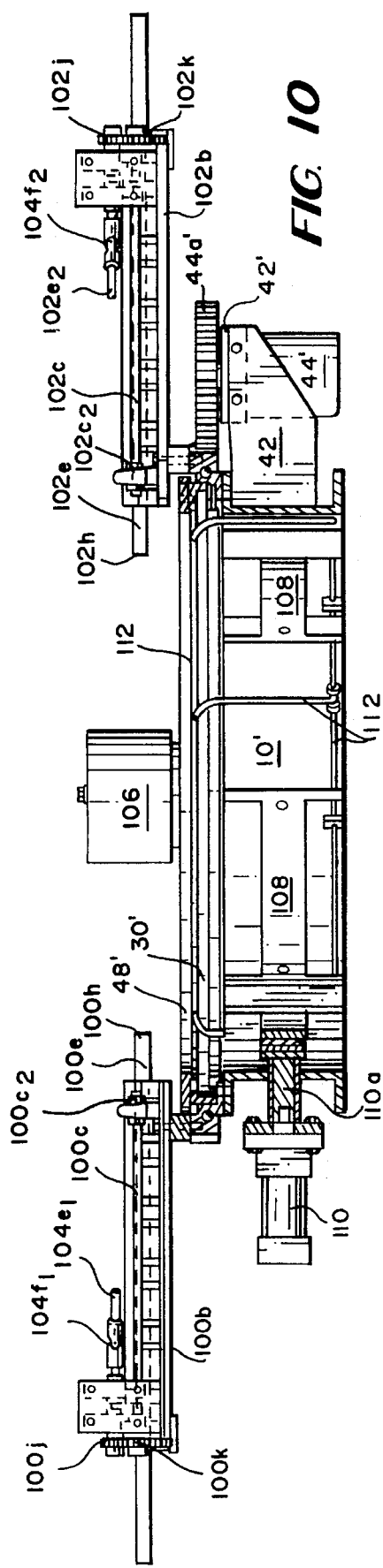

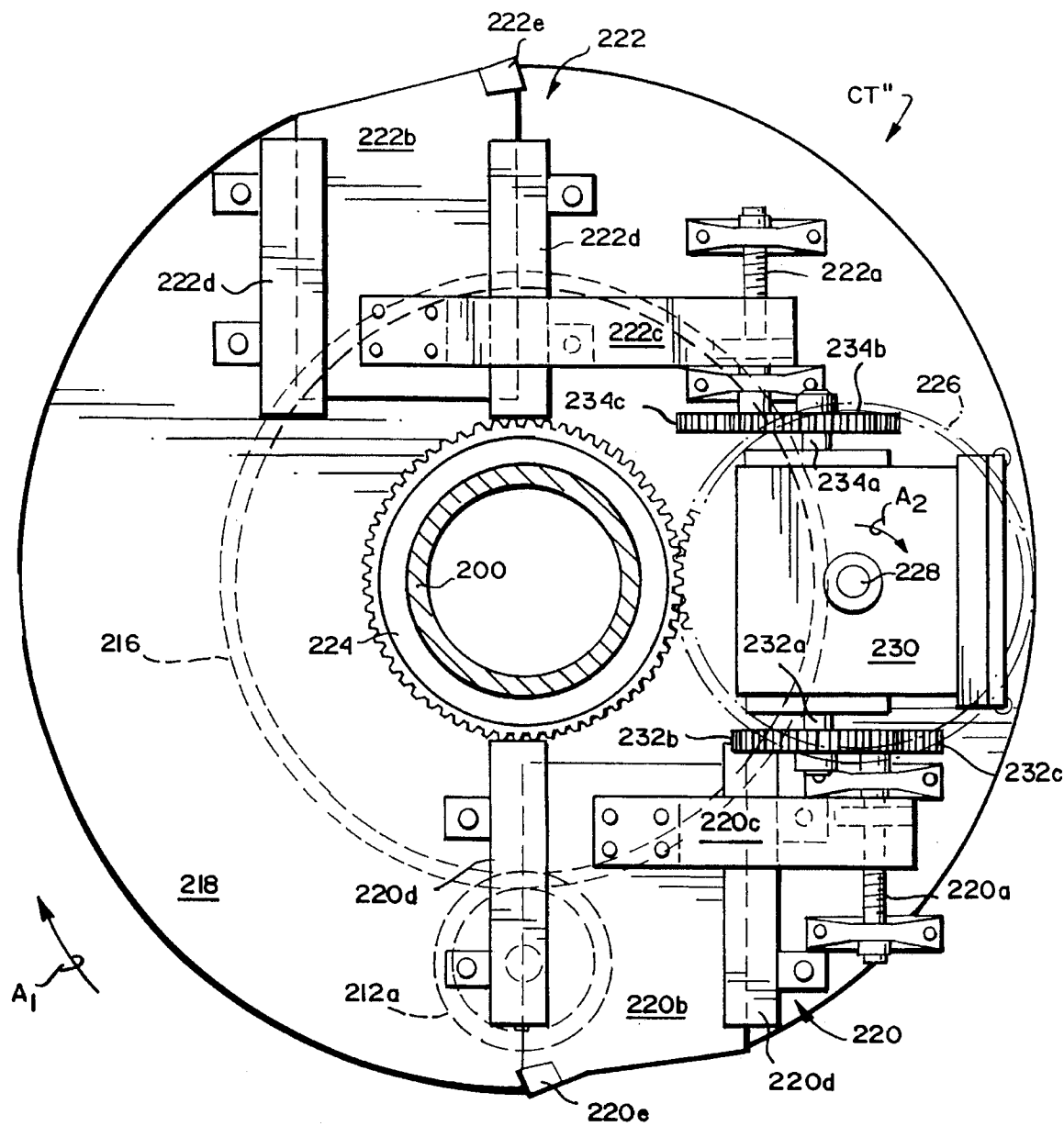

RADIAL CUTTING TOOLS FOR CUTTING THICK-WALLED TUBULAR MEMBERS

CROSS-REFERENCE TO RELATED APPLICATIONS

This application is a continuation-in-part of copending U.S. Pat. application Ser. No. 08/361,826 filed on Dec. 22, 1994, which in turn is a continuation-in-part of U.S. patent application Ser. No. 08/045,411 filed on Apr. 13, 1993 (now U.S. Pat. No. 5,394,776), the entire content of each prior filed application being incorporated expressly hereinto by reference.

FIELD OF INVENTION

The present invention relates generally to tools and methods employed to sever tubular members. In preferred forms, the present invention is embodied in a cutting tool having an especially configured bit and an extent of radial bit travel which allows cutting and severing of relatively thick-walled tubular members.

BACKGROUND AND SUMMARY OF THE INVENTION

It is sometimes necessary to field-sever pipes, columns, and the like in a variety of endeavors. For example, in the exploration/production of off-shore oil and natural gas, it may be necessary periodically to abandon a particular exploration/production site and relocate the associated off-shore platform due to exhaustion of the oil and gas field and/or changed economic conditions which mitigates against continued exploration/production at a particular site. Relocation of the off-shore platform, however, cannot occur until all of the well casings extending from the underwater floor have been severed at a height where they would not present an obstacle to mariners, especially nets which are trawled by fisherman.

The well casings which are employed in the off-shore exploration/production of oil and natural gas, however, are typically thick composite-walled structures to prevent casing rupture and the environmental devastation which could ensue. That is, it is not uncommon for a single well casing to be composed of several sleeved pipes of increasing diameters with the space between adjacent ones of the pipes being filled with reinforcing cementation. Special difficulties in addition to the underwater environment are thus presented when an attempt is made to sever such well casings due to their relatively thick-walled structure.

While a variety of pipe machining/cutting tools and so-called pipe lathes are well known in the art (see, for example, U.S. Pat. Nos. 3,848,489 to Santana; 4,213,357 to Lively et al; 4,665,782 to VanderPol; 4,754,672 to VanderPol; 4,739,685 to Ricci; and 4,944,205 to Ricci), they are deficient in terms of their ability to cut relatively thick-walled tubular articles of the type typically encountered in connection with underwater well casings. That is, to the best of the present inventor's knowledge, none of the prior art devices are capable or could obviously be modified to function in the manner demanded when underwater thick-walled well cases are to be cut.

What has been needed in this art therefore, is a cutting tool which has the ability to reliably cut and sever relatively thick-walled tubular members (e.g., underwater composite well casings, as well as hollow or solid tubular support columns formed of metal, cement or the like). It is towards providing such a tool that the present invention is directed.

Broadly, the present invention is embodied in a tool having a cutting assembly which is both orbitally and radially movable relative to a central longitudinal axis of the tubular member being cut, whereby the cutting bit and associated support structures of the cutting assembly have an extent of radial travel and a structural configuration which allow for bit movement sufficient to cut relatively thick-walled tubular members (e.g., to, and preferably at least slightly through, the longitudinal center of the tubular member).

More specifically, the present invention is embodied in a cutting tool for cutting thick-walled tubular members which includes a stationary annular frame and a radial cutting assembly which is radially mounted on the frame for orbital movement about the tubular member being cut. The radial cutting assembly is itself provided with a cutting bit subassembly that is radially advanced into the tubular member in response to the cutting assembly's orbital movement.

A cutting bit is carried forwardly of a radially movable bit support block. As viewed in relation to the longitudinal axis of the tubular member being cut, the cutting bit presents a cutting edge that has a greater dimension as compared to the following bit support block and associated structure. As such, the following supporting structure for the bit will establish passageways when the bit is advanced sufficiently into the tubular member being cut to conveniently allow for shavings and debris to be removed from the cutting face of the bit. Moreover, such established passageways allow lubricating/flushing fluid (e.g., water, oil or the like) to be admitted to the bit so as to assist in the cutting operation.

Further aspects and advantages will become evident from the following detailed description of the preferred exemplary embodiments thereof.

BRIEF DESCRIPTION OF THE ACCOMPANYING DRAWINGS

Reference will hereinafter be made to the accompanying drawings wherein like reference numerals throughout the various FIGURES denote like structural elements, and wherein;

FIG. 6 is a cross-sectional elevational view of the radial cutting arm assembly shown in FIG. 5 as taken along line 6—6 therein;

Figure 7A:
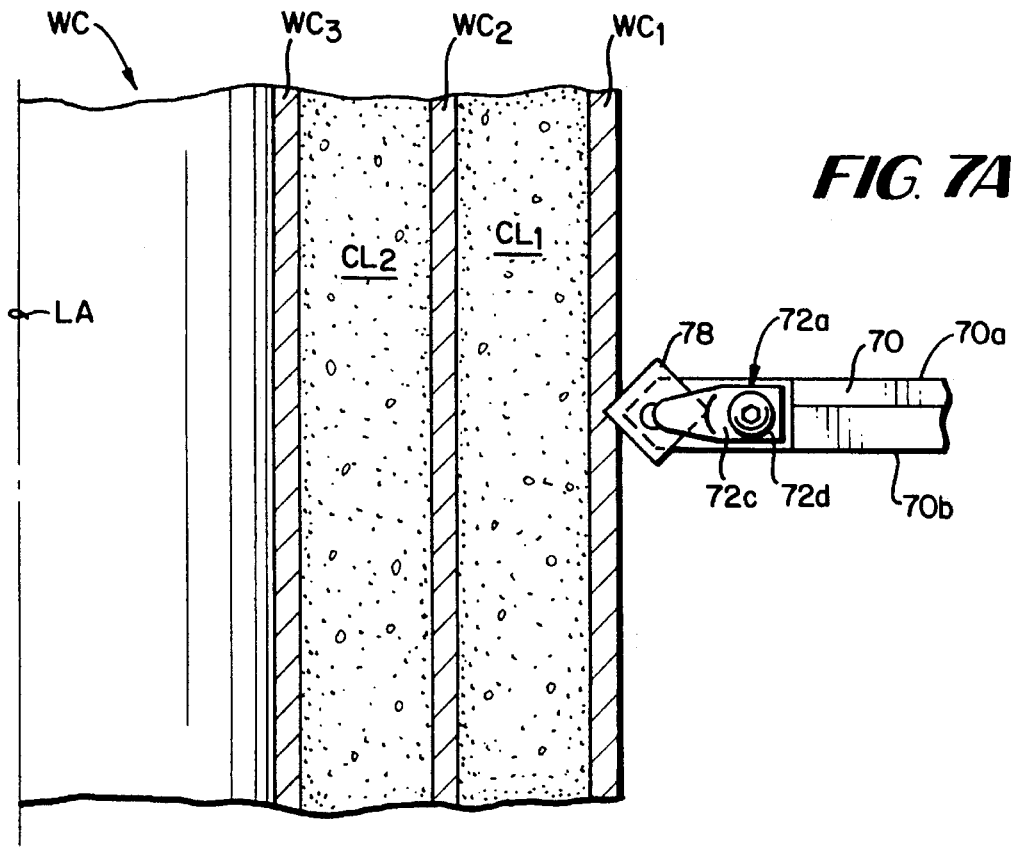
Figure 7B:
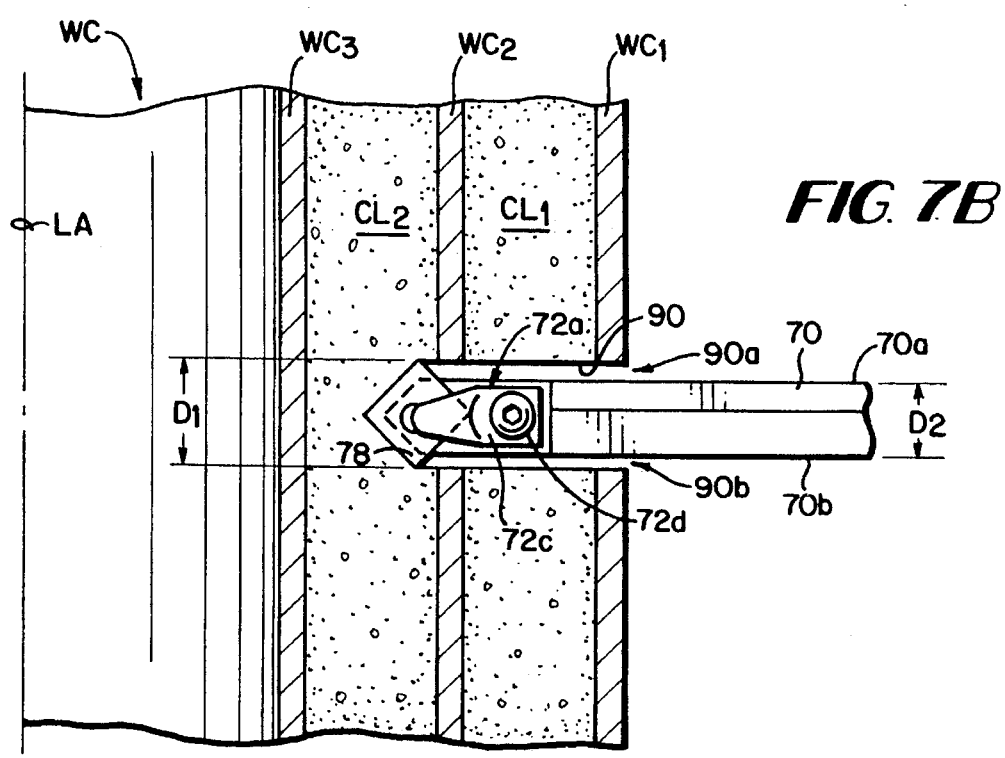
Figure 8:
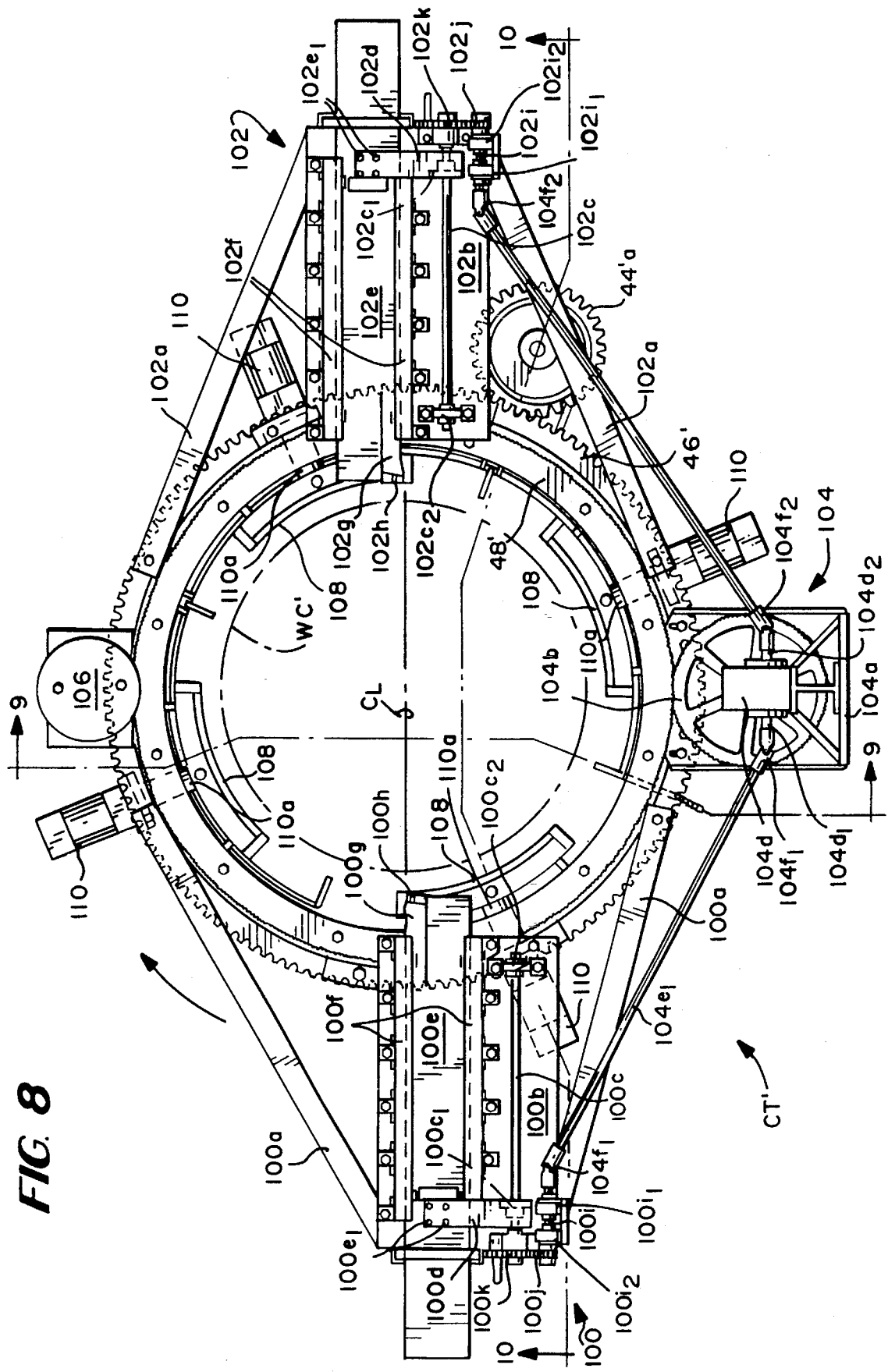
Figure 11:
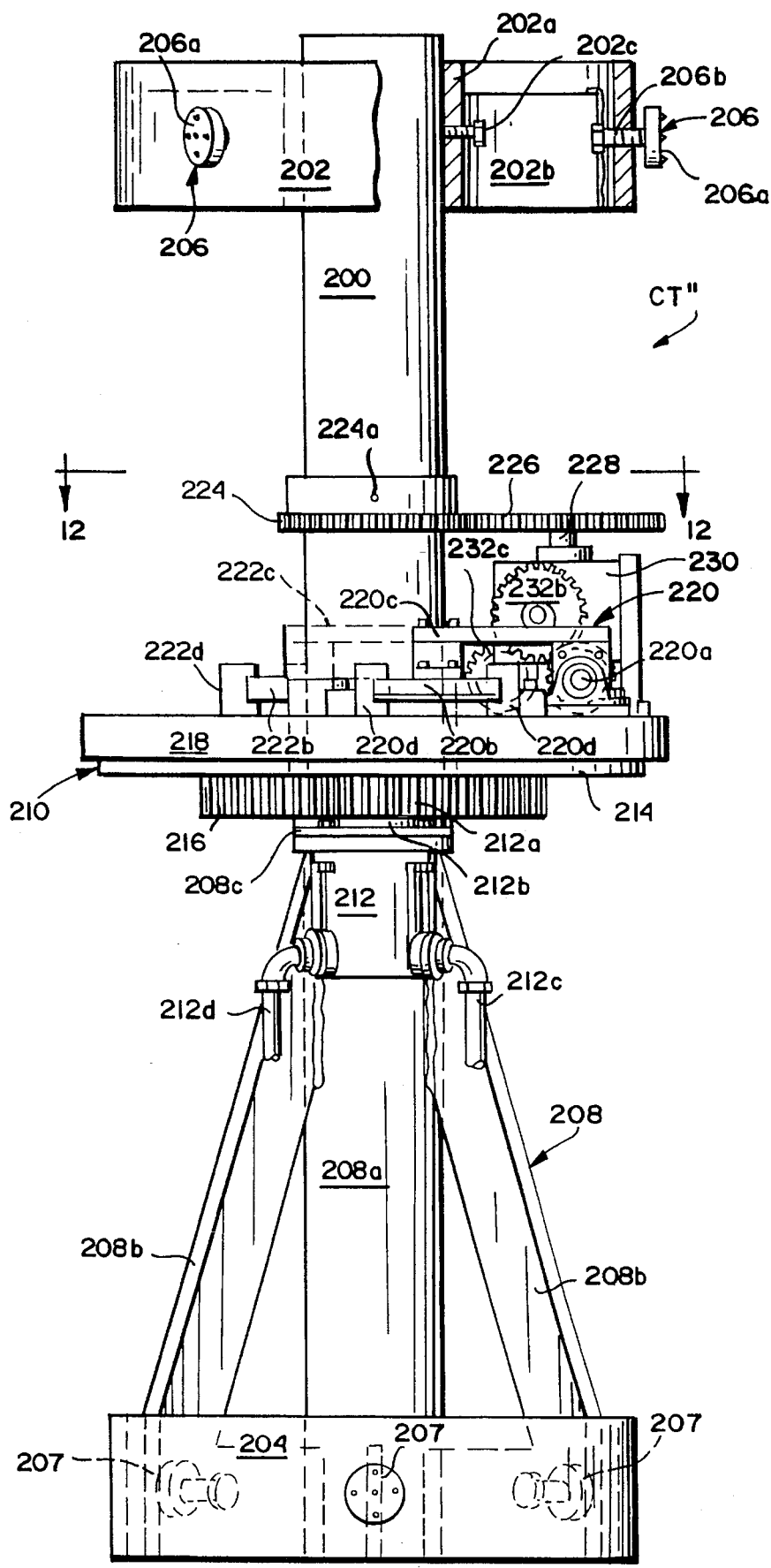

FIGS. 7A and 7B schematically show the relationship between the cutting bit subassembly and the thick-walled tubular member being cut at different stages during the cutting operation;

FIG. 8 is a top plan view of another embodiment of the radial cutting tool according to this invention employing multiple opposed orbital radial bit assemblies;

FIG. 9 is a cross-sectional elevation view of the radial cutting tool shown in FIG. 8 as taken along line 9—9 therein;

FIG. 10 is a cross-sectional elevation view of the radial cutting tool shown in FIG. 8 as taken along line 10—10 therein;

FIG. 11 is a side elevational view, partly in section, of another embodiment of a radial cutting tool according to this invention which is especially adapted to being positioned within the tubular member to be cut; and FIG. 12 is a cross-sectional plan view of the radial cutting tool shown in FIG. 11 as taken along line 12—12 therein.

DETAILED DESCRIPTION OF THE PREFERRED EXEMPLARY EMBODIMENTS

Figure 1:
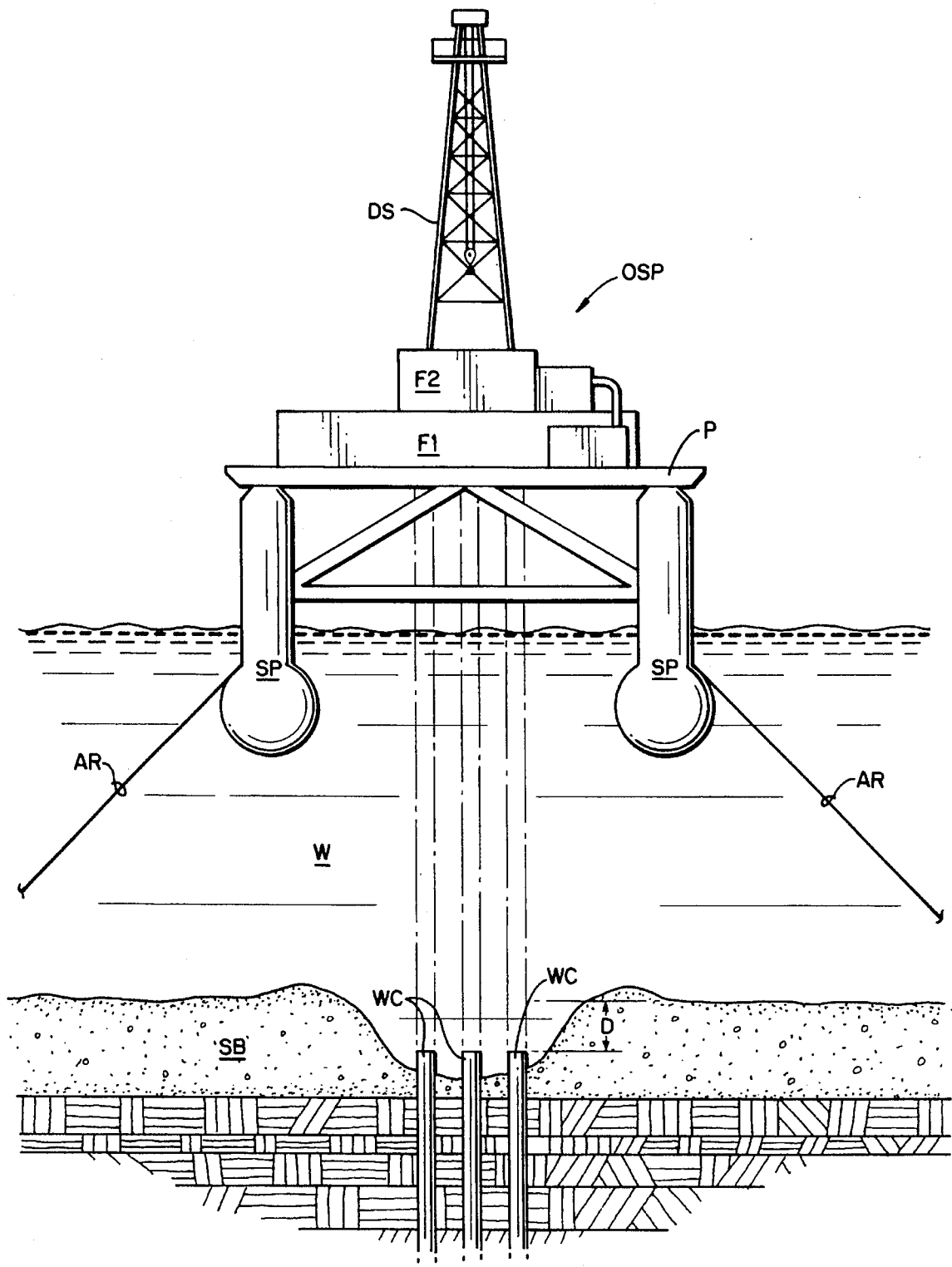
FIG. 1 is a schematic elevational view of an off-shore oil and gas exploration/production platform showing a representative number of well casings associated therewith.

As noted briefly above, the cutting tool of this invention is especially adapted to cutting relatively thick-walled well casings WC associated with an off-shore oil and gas exploration/production platform OSP as schematically depicted in accompanying FIG. 1. As used herein and in the accompanying claims, the term "thick-walled" and like terms are meant to refer to tubular members having a wall thickness dimension to be cut that is at least about 30%, and more likely at least about 50% or more (e.g., greater than about 75%) of the overall radial dimension of the tubular member. Thus, the term "thick-walled" and like terms are meant to refer to both hollow and solid tubular members.

The off-shore platform OSP is in and of itself conventional in that it may include support piers SP which support a platform P, exploration/production facilities F1 and F2, and a derrick superstructure DS above the surface of the water W. The off-shore platform OSP is positionally fixed at the exploration/production site by any conventional means, such as by suitable anchors (not shown) attached to the support piers SP by anchor rodes AR.

During exploration and/or production of oil and/or natural gas, the well casings WC will, of course, extend from the subterranean oil/gas reservoir to the facilities F1 and/or F2 supported on the platform P. When the off-shore exploration/production site is to be abandoned, however, the individual well casings WC must be cut and capped at a level which would not present an obstacle to mariners, for example, a depth D below the surface of the silt bed SB. In this regard, an underwater work crew will initially remove the silt covering a section of the well casings WC to the desired depth D below the silt bed SB surface using high pressure fluid (e.g., high pressure air and/or water). The well casing WC may then be severed at or below the depth D using the radial cutting tool of this invention (to be explained below). Once the upper sections of the well casings (represented by phantom line in FIG. 1) are removed, the remaining lower sections of the well casings (represented by solid line in FIG. 1) may again be covered by silt so as to present no obstacles to mariners. The entire off-shore platform OSP may then be relocated to a new exploration/production site, if desired.

The radial cutting tool CT according to this invention which is especially adapted to cutting the well casings WC at an off-shore platform OSP site as discussed above is shown in accompanying FIGS. 2 and 3. As is seen, the cutting tool CT of this invention is generally comprised of a support collar 10, an annular frame assembly 30, and a radial cutting assembly 50.

The support collar 10 provides a platform for the annular frame assembly 30 and, as such, stabilizes the annular frame assembly 30 in a plane substantially transverse to the central longitudinal axis of the well casing WC. In this regard, the support collar 10 is most preferably a clam-shell structure having a hinge 12 opposite to a clasp 14. Thus, the halves 10a of the support collar 10 may be pivoted relative to one another to facilitate positioning on the exterior surface of the well casing WC. The inner surface of the support collar 10 is most preferably provided with a compressible liner 16 formed, for example, of a suitable elastomeric material so as to enhance the gripping effect which the support collar 10 has on the exterior surface of the well casing WC. The support collar 10 is further provided with upstanding alignment rods 18 which mate with apertured alignment ears 20 disposed on the interior surface of the annular frame 30.

Since the support collar 10 is positionally fixed relative to the well casing WC, it will provide a platform so as to stabilize the annular frame 30. The annular frame 30 is further stabilized (especially against torsional forces) by anchoring feet 32. The forward faces of the anchoring feet 32 are most preferably provided with a number of hardened spikes 32a which may be moved into positive engagement with the exterior surface of the well casing by turning movements being applied to support bolts 32b. In such a manner, the annular frame 30 is stabilized during operation against substantial movement relative to the well casing WC.

An annular bearing flange 36 is rigidly coupled to (e.g., by welding) an exterior surface portion of the annular frame 30 and includes races for an opposed set of ball bearings 38a and 38b, respectively. The bearing flange 36 supports a channel ring assembly 40 for orbital movement about the annular frame 30 (and hence about the well casing WC). That is, the channel ring assembly 40 defines a generally U-shaped annular channel in which the bearing flange 36 is positioned. Orbital movement of the channel ring assembly 38 is thus facilitated by means of the ball bearing sets 38a, 38b contained in their respective races.

The annular frame 30 also includes a motor mount 42 which supports a drive motor 44. The drive motor 44 is, in turn, coupled to a driven ring gear 46 associated with the channel ring assembly 40 via a drive pinion gear 44a. The motor 44 employed in the cutting tool CT of the present invention is most preferably hydraulic-actuated via hydraulic lines 44b due to the underwater environment in which it is intended for use. However, other motive means, such as electric motors, internal combustion engines, and the like may also be employed in non-submerged environments (e.g., to cut above-ground well casings or other hollow or solid tubular members). It will be appreciated, therefore, that the intermeshed relationship between the drive pinion 44a and the driven ring gear 46 will cause the entire channel ring assembly 40 to orbit in a predetermined direction (i.e., which is preferably clockwise as viewed in FIG. 2, but depends upon the rotation direction of the pinion gear 44a) about the annular frame 30, and hence about the well casing WC. Depending upon the size of the radial cutting assembly 50 (which is dependent upon the maximum size of the tubular member to be cut) it may be necessary to fix a counterpoise (shown in phantom line in FIG. 2 identified by reference numeral 49) to the rotatable channel ring 40 at a location in substantial radial opposition to the cutting assembly 50.

The annular frame 30 also includes a stationary ring gear 48 which is concentrically disposed with respect to the driven ring gear 46 associated with the channel ring assembly 40. The stationary ring gear 48 is, moreover, intermeshed with an indexing gear 52 which is rotatably carried by the radial cutting assembly 50, the purpose of which will be described in greater detail below.

Figure 4:
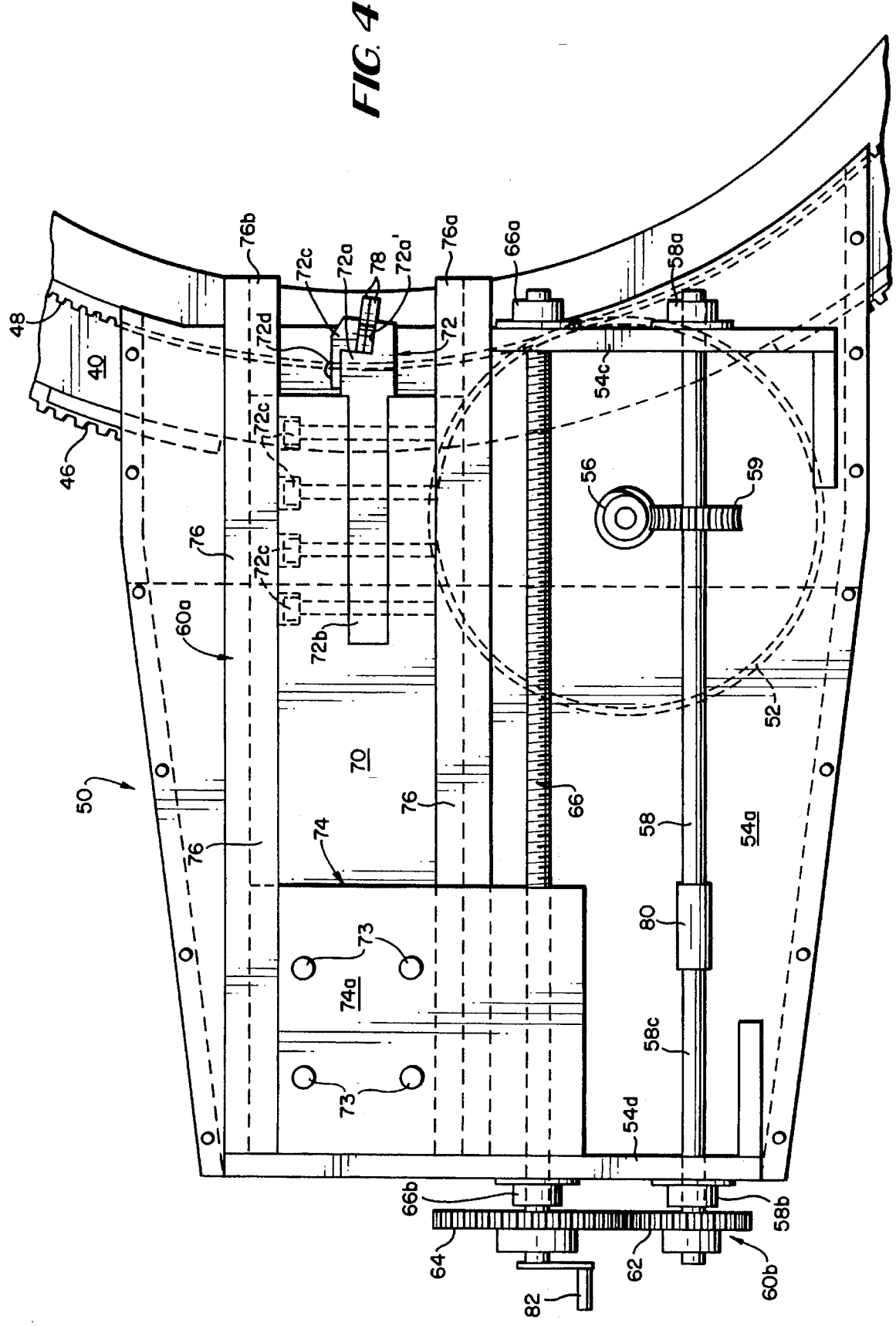
FIG. 4 is an enlarged top plan view of the radial cutting arm assembly associated with the cutting tool of this invention.
Figure 5:
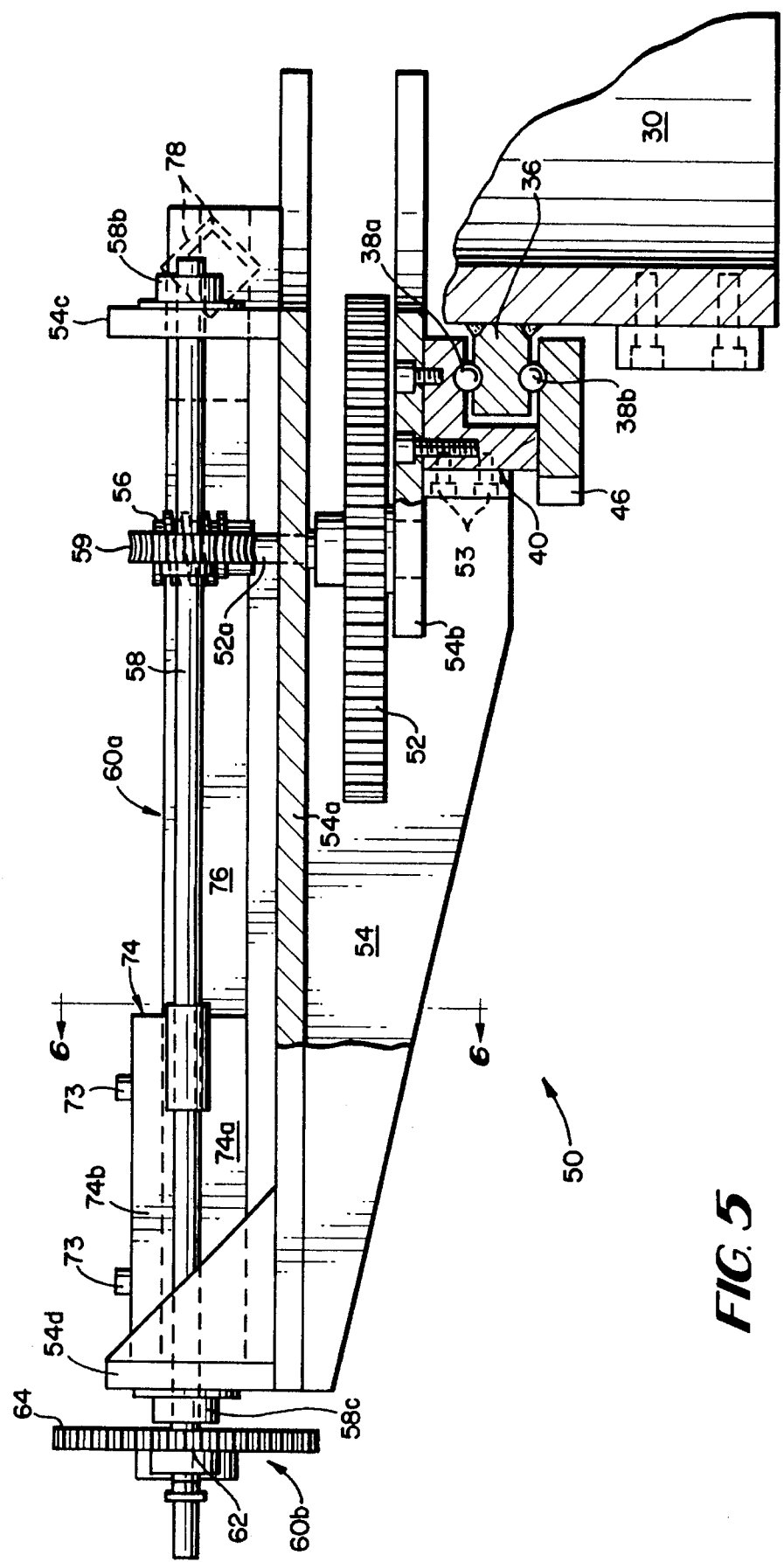
FIG. 5 is a right side elevational view, partly in section, of the radial cutting arm assembly shown in FIG. 4.

The radial cutting assembly 50 is more clearly shown in accompanying FIGS. 4–6 as including a support platform frame 54 which is generally radially oriented relative to the annular frame 30. The support platform frame 54 is rigidly coupled to the annular channel ring 40 by any suitable means, such as welding or by bolts 53 shown in FIG. 5. As a result, the entire support platform frame 54, and the radial bit and indexing subassemblies 60a and 60b, respectively, carried thereby, orbit as a unit with the annular ring channel 40.

The indexing gear 52 is mounted for rotation between upper and lower plate members 54a, 54b, respectively, associated with the support platform plate 54 by means of suitable bearings (not shown) and includes a shaft 52a which carries at its upper end a worm gear 56. The worm gear 56 is, in turn, meshed with an input gear 59 fixed to input shaft 58. The input shaft 58 is mounted between the forward and rearward support flanges 54c, 54d, respectively, of the support platform 54 by bearing structures 58c, 58b to allow for rotation about its longitudinal axis. As a result, rotation of the indexing gear 52 will responsively cause the input shaft to rotate due to the intermeshed relationship of worm gear 56 and input gear 59.

A transfer gear 62 is fixed to the rearward end of the input shaft 58 and is intermeshed with a reducing gear 64 fixed to the rearward end of the threaded indexing shaft 66. The indexing shaft 66, like input shaft 58, is mounted between the support flanges 54c, 54d for rotational movement about its longitudinal axis by means of bearing structures 66a, 66b associated with the forward and rearward support flanges 54c, 54d. Therefore, upon rotation of the input shaft 58, the threaded indexing shaft 66 will simultaneously rotate due to the intermeshing of gears 62 and 64.

The radial bit subassembly 60a is generally comprised of a bit support block 70 which forwardly carries a bit holder 72 and which is rigidly coupled (e.g., via bolts 73) to an actuator block 74. The actuator block 74 includes an indexing block 74a which is threadably coupled to the indexing shaft 66 and a bridge plate 74b which serves to rigidly connect the indexing block 74a to the bit support block 70. In this regard, the indexing block 74a and bridge plate 74b are preferably rigidly connected to one another by welding, but could likewise be connected to one another via removable bolts or the like, if desired. The threaded interconnection between the indexing shaft 66 and indexing block 74a will translate rotational movement of the former into rectilinear movement of the latter (i.e., along the shaft 66). Such rectilinear movement of the indexing block 74a will thereby cause the bit support block 70 to be moved rectilinearly within its guideway 76 by virtue of the rigid interconnection between the indexing block 74a and bit support block 70 provided by the bridge plate 74b.

Although virtually any structure may be employed in order to permit rectilinear sliding movements of the bit support block 70 toward and away from the tubular member to be cut, the preferred structures are shown as guideway 76 in accompanying FIG. 6. In this regard, the guideway 76 most preferably has a pair of spaced-apart inverted L-shaped guide fingers 76a, 76b which define respective guide channels 76a', 76b'. These guide channels 76a', 76b' thus accept and cooperate with laterally outwardly extending guide flanges 70a, 70b, respectively, associated with the bit support block 70 so that only rectilinear movements of the bit support block 70 relative to the guideway 76 (and relative to the tubular member to be cut).

The bit holder 72 includes a forward chuck 72a and a rearward stem 72b. The stem 72b is inserted into, and rigidly held by, the forward end of the bit support block 70 by the removable blind bolt assemblies 72c. Although the stem 72b may be welded to the bit support block 70, the provision of the bolt assemblies 72c allows the entire bit holder 72 to be more easily removed and replaced if needed.

The chuck 72a includes a vertical planar support surface 72a' (see FIG. 4). A pair of cutting bits 78 are provided and are supported against the support surface 72a' by means of L-shaped clamp 72c which is secured to the chuck 72 by chuck bolt 72d. Thus, the clamp 72c rigidly secures the bits 78 to the chuck 72a by tightly pressing the bits 78 against the support surface 72a'. As is also seen in FIG. 4, the planar support surface 72a' is angled in a trailing direction (i.e., away from) the orbital direction of the radial cutting assembly 50 (arrow A1 in FIG. 2). That is, the angled support surface 72a' will cause the vertical plane of the cutting bit 78 to form a like angle (e.g., less than 15°, and typically less than 10°) with a radial plane of the casing being cut which is coincident to the midplane of the chuck 72a. Thus, the support surface 72a' will orient the planar bits 78 substantially parallel to the longitudinal axis of the well casing WC (or other tubular member) being cut, but will cant the cutting edge of the bits 78 in a direction away from the direction in which the bits 78 orbit.

The bits 78 are preferably square-shaped and oriented on the diagonal so as to present a generally triangular-shaped cutting edge to the casing being cut. Although any suitable bit 78 may be employed (subject to the dimensional criteria noted briefly above, and to be discussed in greater detail below), the preferred bit is a coated insert bit commercially available from GTE Valenite Corporation of Madison Heights, Mich. as part number C5BASNMG643GR-235.

In order to permit manual advancement and retraction of the bit 78 toward and away from the tubular member (which might need to occur at the start and finish of the cutting operation, respectively), a spline coupler 80 is provided with input shaft 58 and a handle 82 is provided with reducing gear 64. When the spline coupler 80 is axially moved, the stub shaft 58c will be uncoupled from the input shaft 58 thereby uncoupling the gear 62 from the drive train represented by the gears 52, 56 and 59. As a result of such uncoupling, the handle 82 may be manipulated so as to turn reducing gear 64 in a desired direction to cause the indexing block 74 (and hence the bit 78) to be moved manually toward or away from the tubular member. Preferably, the spline coupler 80 is spring-biased so as to urge the same into a position which couples the shaft 58 to its associated stub shaft 58c.

In operation, a work crew will preposition the support collar 10 so that it is secured to the exterior surface of the tubular member (e.g., a well casing WC) below the desired cut location. In this regard, the support collar 10 will be so positioned as to establish a platform surface for the annular frame 30 of the cutting tool CT which is substantially transverse to the central longitudinal axis of the tubular member to be cut. Thereafter, the annular frame 30 (and its associated radial cutting assembly 50) will be positioned on and supported by the prepositioned collar 10 by aligning the rods 18 with the apertured ears 20. Once the frame 30 is supported on the collar 10, the anchoring feet 32 are advanced into anchoring contact with the exterior surface of the tubular member.

The cutting tool CT of this invention will thus be stabilized against substantial movement as described above and will then be ready to perform a cutting operation on the tubular member. In this regard, the cutting bit 78 may be advanced manually into engagement with the exterior surface of the tubular member to be cut by uncoupling the shaft 58 from its associated stub shaft 58c via spline coupler 80 and manipulating the handle 82 as described previously. Thereafter, with the shafts 58 and 58c again coupled to one another via coupler 80, the motor 44 can be operated so as to cause the channel ring assembly 40 to rotate about the tubular member in a desired direction (e.g., in a clockwise direction shown by arrow A1 in FIG. 2) due to the intermeshed relationship of the drive pinion gear 44a and the driven ring gear 46. Since the entire cutting assembly 50 is rigidly secured to the channel ring assembly 40, it will rotate in the same direction concurrently with the channel ring 40.

As the cutting assembly 50 orbits the tubular member being cut, the bit 78 will continuously be advanced radially toward the central longitudinal axis of the tubular member being cut. That is, since the indexing gear 52 is intermeshed with the stationary ring gear 48, rotation of the channel ring 40 will cause the indexing gear 52 to rotate. Such rotation of the indexing gear 52 will be transferred to the reducing gear 62 via gears 56 and 59, shaft 58 and gear 62 as described previously. Therefore, rotation of reducing gear 64 will, in turn, forwardly drive (i.e., radially toward the central elongate axis of the tubular member being cut) the bit support block 70 (and hence the bit 78 forwardly carried thereby) by virtue of the threaded interconnection of the actuator block 74 and the shaft 66 (which rotates in the same direction as reducing gear 64). Preferably, the gear teeth, and reduction ratios achieved by the indexing subassembly 60b are selected such that, upon each orbit of the radial cutting assembly 50, the bit 78 will have been advanced about 0.015" into the tubular member being cut. Of course, other depth-of-cuts may be achieved depending upon a variety of factors, including the size of the tubular member being cut, the output torque associated with the drive motor, the type of bit employed, and/or the material from which the tubular member is constructed.

Accompanying FIGS. 7A and 7B schematically show the relationship between the tubular member being cut (in this case a well casing WC composed of several metal casing sleeves WC—WC and interposed cementation layers CL—CL) at the beginning of the cutting operation (FIG. 7A) and at a time later in the cutting operation (FIG. 7B). In this regard, it will be observed that the triangular-shaped cutting edge which is presented to the well casing WC by the bit 78 will form a channel cut 90 in the well casing WC from its periphery toward its central longitudinal axis LA as the radial cutting assembly 50 is moved orbitally about the well casing WC.

Furthermore, the channel cut 90 will be in the plane established by, for example, the bit support block 70 (i.e., a plane which is substantially transverse to the central longitudinal axis LA. Since the cutting bit 78 will continuously be advanced into the well casing toward the central longitudinal axis LA as described above, the bit 78 will progressively cut a deeper channel 90 in the sidewall of the well casing WC (e.g., comprised of sleeved well casings WC—WC and interposed cementation layers CL—CL) as can be seen by comparing FIG. 7A to FIG. 7B. Thus, the extent of travel of the bit 78 is such that it has a radial dimension which is at least equal to the thickness of the sidewall of well casing WC. Preferably, however, the radial cutting assembly 50 is configured and sized so that the forwardmost extent of travel of the bit 78 is at least equal to, and more preferably somewhat greater than, the radial dimension of the well casing WC to be cut. In such a manner, "beyond center" (i.e. to and through the central longitudinal axis LA of the well casing WC) cutting may be accomplished so that virtually any wall thickness associated with a well casing WC that may be accommodated by the cutting tool CT according to this invention can be cut and severed.

In order to accomplish the functions noted above, it is important to the cutting tool CT of this invention that the dimension D of the cutting face presented to the well casing by the bit 78 be greater than the width dimension D of the bit support block 70 as measured between its opposed parallel planar surfaces 70c, 70d (see FIG. 6). Thus, since the bit 78 is square-shaped according to the preferred embodiment of this invention and is oriented on its diagonal so as to present a triangular-shaped cutting edge to the well casing WC, subchannels 90a, 90b will be established between each respective surface 70a and 70b of the bit support block 70 and the side wall of the well casing being cut, which serve as a convenient passageway to allow the introduction lubricating/flushing fluid to the bit 78 and the removal of cutting debris therefrom. Most preferably, therefore, the dimension D of the cutting bit 78 is oriented symmetrically with respect to the dimension D of the bit support block 70 so that a slight but meaningful extent of the cutting edge (e.g., between about 0.125" to about 0.150") extends beyond each surface 70a, 70b of the bit support block 70 so that the subchannels 90a, 90b may be formed during the cutting operation.

Accompanying FIGS. 8-10 depict another embodiment of a cutting tool CT' in accordance with the present invention. In this regard, those structural elements depicted in FIGS. 8-10 which are similar to structural elements shown in and one or more of FIGS. 1-7 and discussed above, have been identified with the same reference numeral followed by a prime (') designator. These similar structural elements will thus not be further described since a complete description thereof has been provided above.

As is seen the cutting tool CT' essentially differs from the cutting tool CT discussed previously in that it includes a pair of opposed radial cutting assemblies 100, 102. Specifically, the radial cutting assemblies 100, 102 are each rigidly mounted at opposed positions to a driven orbital ring gear 46'. Lateral support for the radial cutting assemblies 100, 102 is provided by support arms 100a, 102a each having an end fixed rigidly to the ring gear 46' and an opposite end attached to a respective one of the support frames 100b, 102b of the radial cutting assemblies 100, 102. The annular frame 30' also supports a stationary indexing ring gear 48'.

The support platform frames 100b, 102b each carry a threaded indexing shaft 100c, 102c mounted for rotational about its longitudinal axis by means of shaft end bearing assemblies 100$c_1$–100$c_2$ and 102$c_1$ and 102$c_2$, respectively. The indexing blocks 100d, 102d are thus threadably coupled to the indexing shafts 100c, 102c, respectively, such that rotation of the latter will cause the former to be linearly advanced towards/away from the well casing WC' (i.e., in dependence upon the rotation direction of the shafts 100c, 102c). Therefore, since the indexing blocks 100d, 102d are each fixed to a respective bit support block 100e, 102e (i.e., via blots 100$e_1$, 102$e_1$) rotation of the indexing shaft will likewise cause the blocks 100e, 102e to be advanced linearly towards/away from the well casing WC' between its guides 100f, 102f.

The blocks 100e support at a forward end thereof a chuck 100g, 102g which rigidly holds a respective bit 100h, 102h. The bits 100h, 102h are each preferably identical to bits 78 discussed above. Thus, each of the bits 100h. 102h will define a generally triangular-shaped (i.e., V-shaped) cutting edge which protrudes outwardly from the forward ends of the blocks 100e, 102e.

Similar to the embodiment of the cutting tool CT discussed above, the respective bit support blocks 100e, 102e of the cutting tool CT' shown in FIGS. 8–10 are supported so as to be disposed in a cutting plane which is normal to the longitudinal axis of the well casing WC'. In typical applications, therefore, the cutting plane will be disposed horizontally since the well casing WC' will be disposed vertically. The bit support blocks 100e, 102e thus define opposed planar surfaces with are parallel to the defined cutting plane and establish therebetween a thickness dimension which is less than the channel dimension which the bits 100h, 102h cut in the well casing WC' (i.e., as measured in a direction parallel to the longitudinal axis of the well casing WC' due to the bits 100h, 102h being mounted and oriented in a plane which is substantially parallel to the well casing's longitudinal axis). That is, the cutting edges of the bits 100h, 102h will each extend past the opposed parallel planar surfaces of their respective bit support blocks 100e, 102e so that each bit cuts a channel in the tubular member having a dimension measured parallel to the tubular member's longitudinal axis which is greater than the thickness dimension of the bit support blocks 100e, 102e. The bits 100h, 102h are, moreover, disposed so that they positioned within the same cutting plane and thus assist in cutting the same channel in the well casing WC'.

It will further be observed that the bit support blocks 100e and 102e are not precisely diametrically opposed to one another. Instead, the bit support blocks 100e and 102e, while each being parallel to one another, are nonetheless offset to a certain extent relative to a latitudinal center line $C_L$ of the well casing WC' within the substantially horizontal cutting plane defined thereby. This offset of the bit support blocks ensures, however, that the cutting edges of the respective bits 100h, 102h are diametrically opposed to one another along the center line $C_L$ so that the cutting action thereof is balanced.

The cutting tool CT' shown in FIGS. 8–10 is provided with an indexing assembly 104 which serves to index each of the bit support blocks 100e, 102e (and hence the bits 100h, 102h, respectively carried thereby) towards the well casing WC' during orbital movement of the radial cutting assemblies 100, 102 and thereby coordinate the linear movements of the bits 100h, 102h toward the center of the well casing WC' during cutting of a channel therein.

Specifically, the indexing assembly 104 includes a platform frame 104a which is rigidly connected to the orbital ring gear 46' at a radial position substantially midway between the cutting assemblies 100 and 102. The platform frame 104a carries an indexing pinion gear 104b which is intermeshed with the stationary indexing ring gear 48'. The pinion gear 104b is coupled via shaft 104c to a gear box 104 which translates the rotation of the pinion gear 104a about the vertical axis of its shaft 104c into rotation of a horizontally disposed pair of output shafts $104d_1$, $104d_2$. The rotation of output shafts $104d_1$, $104d_2$ is respectively transferred to the indexing drive shafts 100i, 102i associated with the radial cutting assemblies 100, 102 via rigid linkage shafts $104e_1$, $104e_2$. The indexing drive shafts 100i, 102i are each journally coupled to the frames 100b, 102b, respective, by bearings $100i_1$–$100i_2$ and $102i_1$–$102i_2$. The rigid linkage shafts $104e_1$, $104e_2$ are respectively coupled to the output shafts $104d_1$, $104d_2$ and the indexing drive shafts 100i, 102i by means of universal couplings $104f_1$, $104f_2$.

In order to balance the weight of the indexing assembly 104, a counterweight 106 may be provided. The counterweight 106 is fixed to the ring gear 46' at a diametrically opposed position relative to the indexing assembly 104 via its support platform 106a. Thus, the counterweight 106 orbits as unit therewith (and with the radial cutting assemblies 100, 102).

The indexing drive shafts 100i, 102i each carry a gear 100j, 102j which serves to drive an intermeshed gear 100k, 102k carried by the indexing shaft 100c, 102c, respectively. Therefore, in operation, rotation of the ring gear 46' (which is driven by motor 44' and its associated pinion drive gear 44a') will cause the radial cutting assemblies 100, 102 and the indexing assembly 104 to orbit as a unit about the exterior surface of the well casing WC' within a cutting plane disposed substantially normal to the longitudinal axis of the well casing WC'. As a result, the bits 100h, 102h will be incrementally simultaneously advanced into the well casing WC' by virtue of the operation of the indexing assembly 104 and its functional interconnection to the indexing shafts 100c, 102c as discussed above. In this regard, the gearing ratios of the gear box 104d can be selected so as to achieve precise incremental simultaneous linear advancement of the bit support blocks 100e, 102e, and hence the bits 100h, 102h supported thereby into the wall of the well casing WC' by virtually any selected amount of linear displacement per orbital revolution. Thus the rearing ratios of the gear box 104d can be selected so as to prevent (or at least minimize) the possibility of the bits 100h, 102h taking an excessive "bite" from the well casing WC' during each orbit which could disadvantageously halt orbital movement of the radial cutting assemblies 100, 102.

The cutting assembly CT' is most preferably provided with a hydraulically actuated clamping system which serves to positionally fix the cutting tool CT' relative to the exterior surface of the well casing WC'. The clamping system is most preferably provided with a series of clamping shoes 108 which are radially spaced apart about the circumferential interior of the support collar 10'. Each of the clamping shoes 108 is connected to the shaft 110a of a hydraulic actuator ram 110. Hydraulic lines 112 serve to fluid-connect a source of pressurized hydraulic fluid (not shown) with each of the actuator rams 110. In use, therefore, the support collar 10' may initially be positioned about the exterior surface of the well casing WC'. Once the support collar 10' has been positioned as desired (e.g., so as to be disposed in a horizontal plane which is substantially normal to the longitudinal axis of the well casing WC'), the actuator rams 110 may be actuated so as to force the clamping shoes into clamping contact with the exterior surface of the well casing WC'. As a result of such clamping contact, therefore, the support collar, and hence the entire cutting tool CT', will be positionally fixed relative to the well casing WC'.

It will be observed that, although one pair of cutting assemblies 100, 102 have been depicted and discussed above with respect to FIGS. 8–10, the cutting tool CT' could be provided with virtually any desired number of pairs of such cutting assemblies limited, of course, by the particular size of the cutting tool and/or radial cutting assemblies involved. Thus, two or more pairs of radial cutting assemblies similar to assemblies 100 and 102 could likewise be provided without departing from the scope of this invention and depends, for example, in large part on the size of the well casing WC' intended to be cut. In general, with an increasing size of the well casing WC', an increased number of such pairs of radial cutting assemblies should be provided so as to increase the speed at which the cutting tool cuts the well casing wall.

The cutting tools CT and CT' described above are particularly adapted to being concentrically positioned around the exterior of the tubular member to be cut. However, there can arise situations where exterior positioning of the cutting tool is not desirable or feasible (e.g., when external access to the region of the tubular member to be cut is precluded due to the presence of other structural members that may be present). The cutting tool CT" shown in FIGS. 11 and 12, however, is especially adapted to being positioned within the interior of the tubular member to be cut and thus can be employed in such situations.

The cutting tool CT" shown in FIGS. 11 and 12 generally has a center support column 200 to which upper and lower cylindrical positioning rings 202, 204, respectively, are attached. The upper positioning ring 202 includes an upper collar 202a which is sleeved over the upper end of the center support column 200, and support flanges 202b which rigidly connect the upper positioning ring 202 to the collar 202a. The collar 202a may thus be coupled to the center support column 200 by suitable bolts 202c so that the entire upper positioning ring (including the collar 202a and support flanges 202b) may be removed physically from the center support column 200 when the bolts 202c are removed.

Figure 2:
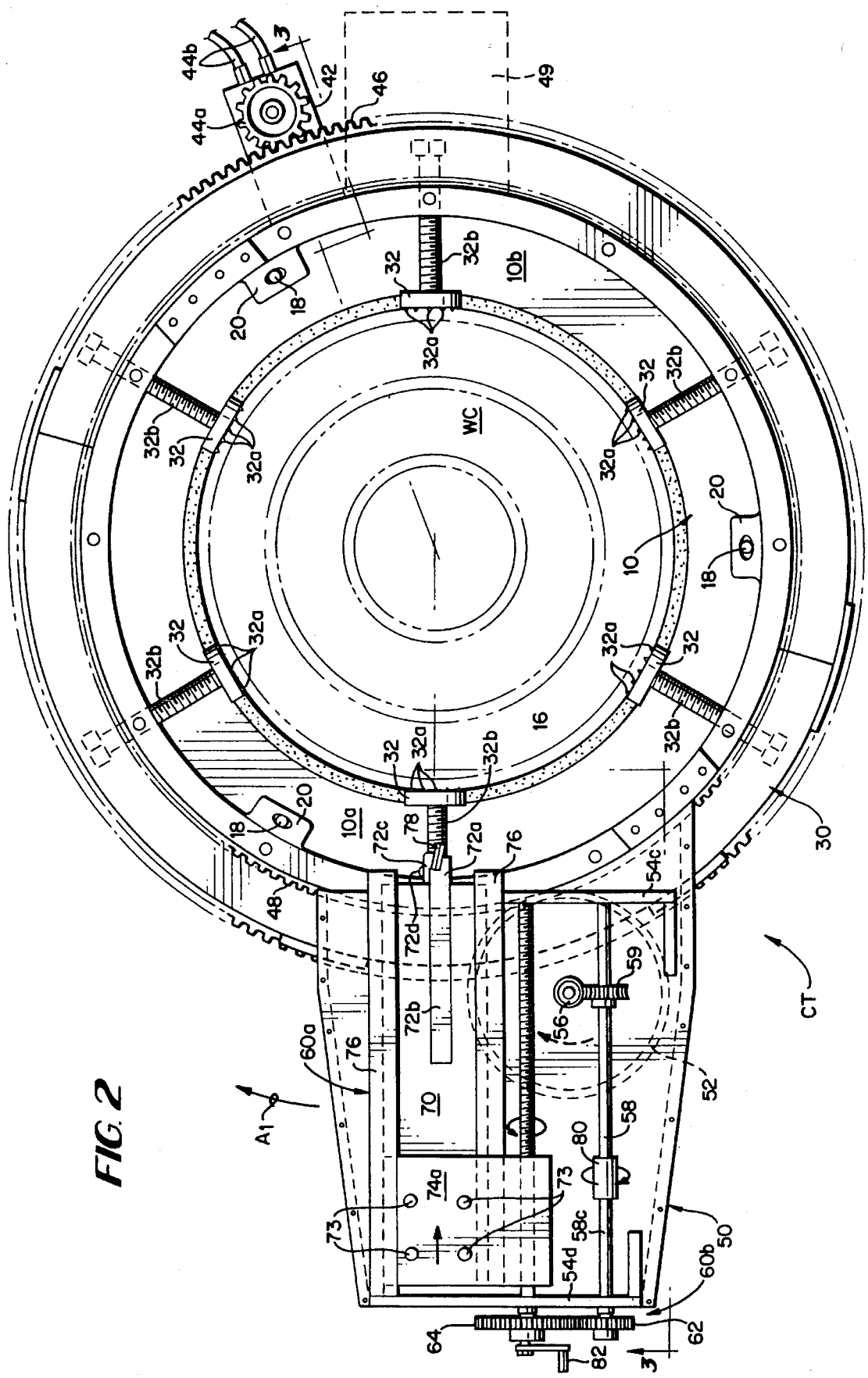
FIG. 2 is a top plan view of the radial cutting tool according to this invention.
Figure 3:
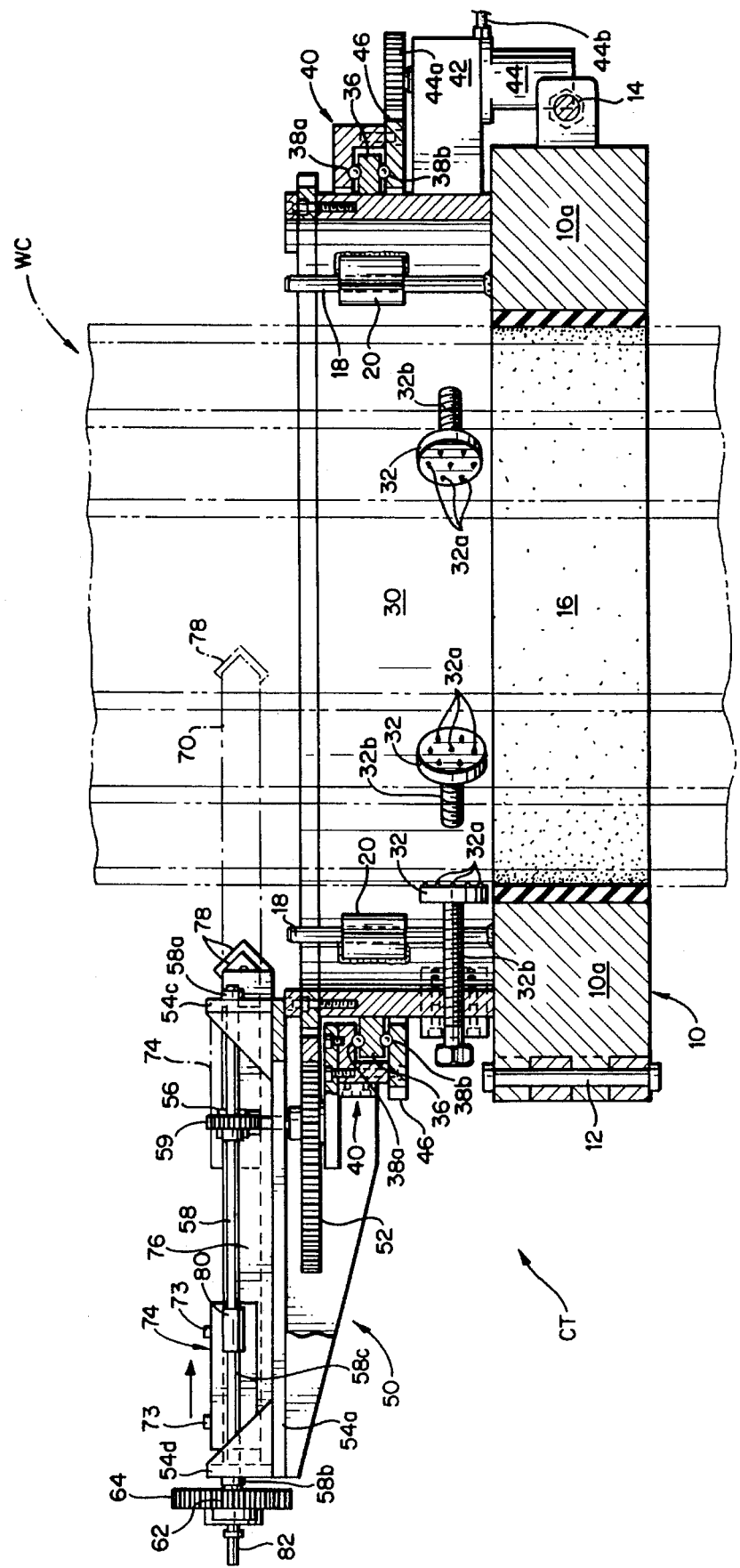
FIG. 3 is a cross-sectional elevational view of the radial cutting tool shown in FIG. 2 as taken along line 3—3 therein.

The upper positioning ring 202 also includes a number of anchoring feet 206 similar to the feet 32 employed in the cutting tool CT shown in FIGS. 2 and 3. That is, the anchoring feet 206 are provided with a forward face 206a having a number of hardened spikes and a threaded shaft 206b which is threadably coupled to the upper positioning ring 202. The threaded shafts 206b may thus be turned so as to move the hardened spikes of the forward face 206a into positive engagement with the interior surface of the tubular member to be cut and thereby positionally maintain the cutting tool CT" within the tubular member to be cut during operation. Alternatively, the anchoring feet 206 may be replaced by hydraulically actuated clamps, for example, the clamping shoes 108 and hydraulic actuator ram 110 as shown in FIGS. 8–10 above, in which case the clamping shoes would have an arcuate convex shape to conform to the interior surface of the tubular member to be cut. Similarly, the lower positioning ring 204 may be provided with anchoring feet 207 as shown and/or hydraulically actuated clamps.

The lower positioning ring 204 is rigidly connected to a frame assembly 208 which includes a tubular center frame element 208a sleeved over a lower portion of the center support column 200 and a number of support brackets 208b. The frame assembly 208 supports the cutting table assembly 210 for rotational movement about the longitudinal axis of the center support column 200 (and hence the longitudinal axis of the tubular member to be cut since the cutting tool CT" is concentrically disposed within the tubular member). In addition, the frame assembly 208 includes a motor mount platform 208c to which is coupled an electrically, or more preferably a hydraulically, actuated drive motor 212.

The cutting table assembly 210 is mounted to the center support column 200 by means of a suitable bearing block 214. A stationary ring gear 216 is fixed to the lower surface of the cutting table 218 and is intermeshed with the pinion gear 212a driven by the output shaft 212b of the motor 212. Thus, operation of the motor 212 (e.g., via hydraulic fluid introduced and withdrawn through lines 212c and 212d, respectively) will cause the table 218 to rotate in a desired direction (e.g., in the clockwise direction of arrow $A_1$ shown in FIG. 12) about the longitudinal axis of the center support column 200.

The cutting table 218 supports a pair of radial cutting assemblies 220, 222 each of which includes a rotatable threaded indexing shaft 220a, 222a, a bit support block 220b, 222b and an indexing block 220c, 222c threadably coupled at one end to the indexing shaft 220a, 222a and rigidly coupled at the other end thereof to the bit support block 220b, 222b, respectively. Thus, rotation of the indexing shafts 220a, 222a will responsively cause their respective bit support block 220b, 222b to be advanced (or retracted) linearly within their respective guideways 220d, 222d relative to the tubular member to be cut. The forward end of the bit support blocks 220a, 222a includes a chuck for a bit 220e, 222e which cut the tubular member in a manner similar to that described above. In this regard, the bit support blocks 220b, 222b and bits 220e, 222e employed in the embodiment shown in FIGS. 11 and 12 are preferably dimensioned in a manner similar to the bit support blocks and bits employed in the embodiment shown in FIGS. 8–10 described above, and thus will not be further described in detail here.

A fixed position ring gear 224 is rigidly coupled (e.g., via bolts 224a, one of which is shown in FIG. 11) concentrically to the exterior surface of the center support column 200. An indexing pinion gear 226 is coupled to the vertically oriented input shaft 228 of the indexing gear box assembly 230 and is intermeshed with the ring gear 224. Thus, upon rotation of the table 218 in the direction of arrow $A_1$, the intermeshed ring and indexing pinion gears 224, 226 will responsively cause the latter to rotate the input shaft 228 in the direction of arrow $A_2$. The gear box assembly 230 translates the rotation of the input shaft 228 into rotation of a pair of horizontally oriented output shafts 232a, 234a. The rotation of the output shafts 232a, 234a is respectively transferred to the indexing drive shafts 220a, 220b associated with the radial cutting assemblies 220, 222 via intermeshed gears 232b, 232c and 234b, 234c. Therefore, in response to rotation of the cutting table 218, the bit support blocks 220b, 222b will be simultaneously incrementally advanced in a radial direction toward the interior surface of the tubular member to be cut—i.e., due to the indexing provided by rotation of the indexing shafts 220a, 222a, respectively.

It should now be realized that the cutting tools of this invention are especially suited to cutting relatively thick walled tubular members, for example, as might be encountered with underwater well casings. However, even though the invention has been described in connection with the cutting of such underwater well casings, it should be understood that such a description represents a preferred exemplary embodiment of the invention. Thus, the cutting tools as described above could be used satisfactorily to cut above-ground well casings or virtually any hollow or solid tubular member (e.g., concrete support piers) that may be desired.

Thus, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A cutting tool for cutting tubular members comprising:

an annular frame assembly which is concentrically positionable relative to the tubular member to be cut such that said cutting tool is disposed in a cutting plane which is normal to the tubular member's longitudinal axis; and a radial cutting assembly coupled to said annular frame assembly for orbital movement within said cutting plane so as to cut said tubular member, wherein said radial cutting assembly includes a bit subassembly having (i) a bit support block which has opposed planar surfaces parallel to said cutting plane so as to establish therebetween a thickness dimension of said bit support block, and (ii) a bit carried rigidly at a forward end of said bit support block so as to be in a mounting plane which is substantially transverse to said opposed parallel planar surfaces and thereby oriented substantially parallel to the tubular member's longitudinal axis, and wherein (iii) said bit has a cutting edge with lateral portions which extend past said opposed parallel planar surfaces of said bit support block such that said bit cuts a channel in the tubular member having a dimension measured parallel to the tubular member's longitudinal axis which is greater than the thickness dimension of said bit support block.

2. A cutting tool as in claim 1, wherein said annular frame assembly includes mounting structures for positionally mounting said cutting tool in a concentric position about an exterior surface of the tubular member to be cut.

3. A cutting tool as in claim 1, wherein said annular frame assembly includes mounting structures for positionally mounting said cutting tool in a concentric position within the tubular member to be cut.

4. A cutting tool as in any one of claims 1–3, further comprising an indexing subassembly for advancing said bit support block into said tubular member in response to said orbital movement of said radial cutting assembly.

5. A cutting tool as in claim 4, wherein said annular frame includes a stationary gear, and wherein said indexing subassembly includes:

an indexing gear intermeshed with said stationary gear of said annular frame;

an indexing block rigidly coupled to said bit support block; and a drive train operatively connecting said indexing gear and indexing block for translating rotational movement of said indexing gear into rectilinear movement of said indexing block in response to said orbital movement of said radial cutting assembly.

6. A cutting tool as in claim 5, wherein said drive train includes:

an input shaft;

a drive gear assembly operatively connecting said indexing gear and input shaft so that said input shaft rotates in response to rotation of said indexing gear;

a rotatable threaded indexing shaft which is threadably coupled to said indexing block; and a gear reduction assembly operatively interconnecting said input and indexing shafts so that said indexing shaft rotates in response to said input shaft and thereby rectilinearly moves said indexing block.

7. A cutting tool as in claim 6, wherein said input shaft includes a stub shaft and a spline coupler which normally couples said stub and input shafts.

8. A cutting tool as in claim 7, wherein said gear reduction assembly includes a handle to allow manual advancement of said indexing block when said stub and input shafts are uncoupled by said spline coupler.

9. A cutting tool as in claim 1, wherein said annular frame includes a bearing flange, and a channel ring rotatably coupled to said bearing flange, and wherein said radial cutting assembly is rigidly connected to said channel ring.

10. A cutting tool as in claim 9, further said channel ring includes a driven ring gear, and wherein said annular frame supports a motor having a drive pinion gear intermeshed with said driven ring gear.

11. A cutting tool as in any one of claims 1–3, wherein said annular frame includes a number of radially disposed anchoring feet moveable into anchoring contact with the tubular member.

12. A cutting tool as in claim 1, wherein said bit defines a substantially V-shaped cutting edge which protrudes outwardly from said bit support block.

13. A cutting tool as in claim 12, wherein said bit is substantially triangularly shaped.

14. A cutting tool as in claim 1, wherein said bit is substantially planar and wherein said mounting plane forms an angle with a radial plane of the tubular member which is coincident to a midplane of said bit support block.

15. A cutting tool as in claim 1 or 14, wherein said bit support block includes a chock defining a planar support surface, and a clamp which forcibly clamps said bit against said support surface.

16. A cutting tool as in claim 1, further comprising a counterpoise fixed to said annular frame for orbital movement about said tubular member at a location in substantial radial opposition to said radial cutting assembly.

17. A cutting tool as in any one of claims 1–3, which comprises at least one pair of said radial cutting assemblies coupled at generally opposed positions to said annular frame assembly.

18. A cutting tool as in any one of claims 1–3 further comprising a plurality of clamping shoes circumferentially spaced-apart along an interior of said annular frame assembly and radially displaceable towards and away from the tubular member to be cut for clamping said cutting tool to the tubular member such that said cutting tool is disposed in said cutting plane, and hydraulic actuators operatively coupled to said clamping shoes for causing radial displacement of said clamping shoes.

19. A cutting tool for cutting tubular members comprising:

an annular frame assembly which is concentrically positionable relative to the tubular member to be cut such that said cutting tool is disposed in a cutting plane which is normal to the tubular member's longitudinal axis;

a pair of radial cutting assemblies coupled at generally opposed locations to said annular frame for orbital movement as a unit within said cutting plane, wherein each of said radial cutting assemblies includes a bit subassembly having (i) a bit support block which is radially movable within said cutting plane toward said tubular member, and (ii) a bit held by said bit support block at a forward end thereof; and an indexing assembly coupled operatively to each of said radial cutting assemblies for responsively moving each said bit support block radially towards said tubular member simultaneously during orbital movement thereof about said tubular member.

20. A cutting tool as in claim 19, wherein said annular frame assembly includes mounting structures for positionally mounting said cutting tool in a concentric position about an exterior surface of the tubular member to be cut.

21. A cutting tool as in claim 19, wherein said annular frame assembly includes mounting structures for positionally mounting said cutting tool in a concentric position within the tubular member to be cut.

22. A cutting tool as in any one of claims 19–21, wherein said indexing assembly includes:

a stationary indexing gear concentrically associated with said annular frame assembly;

an indexing pinion gear intermeshed with said stationary indexing gear and coupled to said annular frame assembly at a circumferential location between said pair of radial cutting assemblies;

a gear box having a pair of output shafts, said gear box being coupled operatively to said indexing pinion gear to translate rotation of said indexing pinion gear during orbital movement thereof into rotation of each of said output shafts; and a pair of mechanical linkages operatively interconnecting respective ones of said output shafts and said bit support blocks for causing each of said bit support blocks to be radially simultaneously moved towards said tubular member in response to rotation of said output shafts.

23. A cutting tool as in claim 22, wherein said mechanical linkages are shafts or intermeshed gears.

24. A cutting tool as in claim 22, wherein
each said radial cutting assembly includes:
an indexing shaft threadably coupled to said bit support block such that rotation of said indexing shaft is responsively translated into linear movement of said bit support block towards said tubular member;
an indexing drive shaft intermeshed with said indexing shaft; and wherein
each of said linkage shafts is coupled at one end to a respective said indexing drive shaft.

25. A cutting tool as in claim 24, wherein each of said linkage shafts includes universal joints operatively coupling said linkage shafts to a said respective output shaft and indexing drive shaft.

26. A cutting tool as in claim 19, further comprising:
a plurality of clamping shoes circumferentially spaced-apart along an interior of said annular frame assembly and radially displaceable towards and away from the tubular member to be cut for clamping said cutting tool to the tubular member such that said cutting tool is disposed in said cutting plane; and
hydraulic actuators operatively coupled to said clamping shoes for causing radial displacement of said clamping shoes.

27. A cutting tool for a cutting tubular member having a longitudinal axis and an interior surface which defines a cylindrical interior space, said cutting tool comprising:
a mounting frame for positionally mounting said cutting tool within said cylindrical interior space, said mounting frame including,
a central support column, and
an annular mounting frame fixed to said support column and adapted to being brought into contact with said interior surface of the tubular member to be cut so as to position said cutting tool concentrically within the tubular member's cylindrical interior space; and
a radial cutting assembly mounted operatively to said mounting frame for cutting the tubular member, said radial cutting assembly including;
a cutting table assembly which is coupled to said mounting frame for rotational movement about the tubular member's longitudinal axis, said table assembly defining a cutting plane which is positioned substantially normal to the tubular member's longitudinal axis;
a cutting bit assembly carried by said cutting table assembly so that said cutting bit assembly rotates about the tubular member's longitudinal axis with said cutting table assembly, said cutting bit assembly being mounted to said cutting table assembly for radial rectilinear advancement toward the interior surface of the tubular member; and
an indexing assembly operatively coupled to said cutting bit assembly for radially advancing said cutting bit assembly in response to rotational movement of said table assembly about the tubular member's longitudinal axis, whereby the tubular member is cut at said cutting plane.

28. A cutting tool as in claim 27, wherein said annular mounting frame includes upper and lower positioning rings respectively attached to upper and lower portions of said central support column for positionally mounting said cutting tool in a concentric position within the tubular member to be cut.

29. A cutting tool as in claim 28, wherein said upper position ring includes a collar member removably attached to said upper portion of said central support column.

30. A cutting tool as in claim 27, wherein said mounting frame includes a stationary gear, and wherein said indexing assembly includes:
an indexing gear intermeshed with said stationary gear of said mounting frame;
an indexing block rigidly coupled to said bit support block; and
a drive train operatively connecting said indexing gear and indexing block for translating rotational movement of said indexing gear into rectilinear advancement of said indexing block in response to said rotational movement of said cutting table assembly.

31. A cutting tool as in claim 30, wherein said drive train includes:
an input shaft coupled to said indexing gear so that said input shaft rotates in response to rotation of said indexing gear;
a rotatable threaded indexing shaft which is threadably coupled to said indexing block; and
a gear train assembly operatively interconnecting said input and indexing shafts so that said indexing shaft rotates in response to said input shaft and thereby rectilinearly advances said indexing block.

32. A cutting tool as in claim 27, wherein said cutting bit assembly includes a pair of said radial cutting assemblies carried by said cutting table assembly.

33. A cutting tool as in claim 32, wherein said indexing assembly includes:
an indexing gear box having an input shaft and a pair of output shafts;
an indexing gear assembly coupled operatively to said input shaft of said indexing gear box for rotating said input shaft in response to rotation of said cutting table assembly; and
a drive train assembly operatively interconnecting each of said output shafts to a respective one of said radial cutting assemblies, said indexing gear box translating rotation of said input shaft into rotation of said output shafts such that said drive train assembly causes each said cutting bit assembly of said radial cutting assemblies to be radially advanced toward the interior surface of the tubular member.

34. A cutting tool as in claim 33, wherein said mounting frame includes a stationary gear, and said indexing gear assembly includes an indexing gear intermeshed with said stationary gear of said mounting frame.

35. A cutting tool as in claim 34, wherein each said radial cutting assemblies includes an indexing block rigidly coupled to said bit support block, and wherein said drive train assembly operatively connects said indexing gear and indexing block for translating rotational movement of said indexing gear into rectilinear advancement of said indexing block in response to said rotational movement of said cutting table assembly.

36. A cutting tool as in claim 35, wherein said drive train includes:
   rotatable threaded indexing shafts associated with respective ones of said radial cutting assemblies, each said indexing shaft being threadably coupled to a respective said indexing block; and
   a gear train assembly operatively interconnecting each of said output shafts and a respective said indexing shaft so that both said indexing shafts rotate simultaneously in response to said rotation of said input shaft and thereby rectilinearly advancing said respective indexing blocks.

37. A cutting tool for cutting a tubular member comprising:
   a mounting frame for positionally mounting said cutting tool concentrically within the tubular member;
   a cutting table assembly coupled to said mounting frame for rotational movement about the tubular member's longitudinal axis and defining a cutting plane which is positioned substantially normal to the tubular member's longitudinal axis;
   a pair of opposed cutting bit assemblies carried by said cutting table assembly within said defined cutting plane so that said cutting bit assemblies rotate as a unit with said cutting table assembly about the tubular member's longitudinal axis; and
   an indexing assembly coupled operatively to said pair of cutting bit assemblies for rectilinearly advancing said pair of cutting bit assemblies toward an interior surface of the tubular member in response to rotation of said cutting table assembly, whereby the tubular member is cut at said cutting plane.

38. A cutting tool as in claim 37, wherein said mounting frame includes a central support column adapted to being positioned in coaxial alignment with the tubular member's longitudinal axis, and upper and lower positioning rings respectively attached to upper and lower portions of said central support column for positionally mounting said cutting tool in a concentric position within the tubular member to be cut.

39. A cutting tool as in claim 38, wherein said upper positioning ring includes a collar member removably attached to said upper portion of said central support column.

40. A cutting tool as in any one of claims 37–39, wherein said mounting frame includes a stationary gear, and said indexing assembly includes an indexing gear intermeshed with said stationary gear of said mounting frame.

41. A cutting tool as in claim 40, wherein
   each of said cutting assemblies include a bit support block and an indexing block rigidly coupled to said bit support block, and wherein
   said indexing assembly includes a drive train operatively connecting said indexing gear and each of said indexing blocks of said cutting assemblies for translating rotational movement of said indexing gear into rectilinear advancements of said indexing blocks in response to said rotational movement of said cutting table assembly.

42. A cutting tool as in claim 41, wherein said drive train includes a pair of indexing shafts each threadably coupled to a respective said indexing block.

* * * * *